(12) United States Patent
Kien et al.

(10) Patent No.: US 8,911,850 B2
(45) Date of Patent: Dec. 16, 2014

(54) AMORPHOUS PATTERNS COMPRISING ELONGATE PROTRUSIONS FOR USE WITH WEB MATERIALS

(75) Inventors: Kathryn Christian Kien, Cincinnati, OH (US); Michael Scott Prodoehl, West Chester, OH (US); Ward William Ostendorf, West Chester, OH (US); Robert Stanley Ampulski, Fairfield, OH (US); Osman Polat, Montgomery, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 1763 days.

(21) Appl. No.: 11/147,695

(22) Filed: Jun. 8, 2005

(65) Prior Publication Data

US 2006/0280909 A1 Dec. 14, 2006

(51) Int. Cl.
*B32B 3/00* (2006.01)
*D21H 27/02* (2006.01)

(52) U.S. Cl.
CPC .................. *D21H 27/02* (2013.01)
USPC .......................... 428/156; 428/131

(58) Field of Classification Search
CPC .......... B21B 3/0028; B21B 3/00; B21B 3/28; D21H 27/02
USPC ................................. 428/131, 156
See application file for complete search history.

(56) References Cited

U.S. PATENT DOCUMENTS

| | | |
|---|---|---|
| 4,158,594 A | 6/1979 | Becker et al. |
| 4,208,459 A | 6/1980 | Becker et al. |
| 4,320,162 A | 3/1982 | Schulz |
| 4,483,728 A | 11/1984 | Bauernfeind |
| 4,514,345 A | 4/1985 | Johnson et al. |
| 4,528,239 A | 7/1985 | Trokhan |
| 4,529,480 A | 7/1985 | Trokhan |
| 4,546,029 A | 10/1985 | Cancio et al. |
| 4,637,859 A | 1/1987 | Trokhan |
| 4,759,967 A | 7/1988 | Bauernfeind |
| 4,921,034 A | 5/1990 | Burgess et al. |
| 5,098,522 A | 3/1992 | Smurkoski et al. |
| 5,245,025 A | 9/1993 | Trokhan et al. |
| 5,260,171 A | 11/1993 | Smurkoski et al. |
| 5,275,700 A | 1/1994 | Trokhan |
| 5,328,565 A | 7/1994 | Rasch et al. |
| 5,334,289 A | 8/1994 | Trokhan et al. |
| 5,364,504 A | 11/1994 | Smurkoski et al. |
| 5,431,786 A | 7/1995 | Rasch et al. |
| 5,496,624 A | 3/1996 | Stelljes, Jr. et al. |
| 5,500,277 A | 3/1996 | Trokhan et al. |
| 5,514,523 A | 5/1996 | Trokhan et al. |
| 5,527,428 A | 6/1996 | Trokhan et al. |
| 5,554,467 A | 9/1996 | Trokhan et al. |
| 5,566,724 A | 10/1996 | Trokhan et al. |
| 5,624,790 A | 4/1997 | Trokhan et al. |
| 5,628,876 A | 5/1997 | Ayers et al. |
| 5,662,758 A | 9/1997 | Hamilton et al. |
| 5,679,222 A | 10/1997 | Rasch et al. |

(Continued)

*Primary Examiner* — Donald J Loney
(74) *Attorney, Agent, or Firm* — Peter D. Meyer

(57) ABSTRACT

Three-dimensional web materials, more particularly, a three-dimensional web material having a first side and a second side are disclosed herein. The first side comprises at least one region having a plurality of spaced elongate three-dimensional protrusions extending outwardly from the first side which are preferably unitarily formed from the web material. The elongate protrusions form an amorphous pattern of a plurality of elongate two-dimensional geometrical shapes.

19 Claims, 1 Drawing Sheet

(56) References Cited

U.S. PATENT DOCUMENTS

| | | |
|---|---|---|
| 5,714,041 A | 2/1998 | Ayers et al. |
| 5,906,710 A | 5/1999 | Trokhan |
| 5,948,210 A | 9/1999 | Huston |
| 5,954,097 A | 9/1999 | Boutilier |
| 5,965,235 A | 10/1999 | McGuire et al. |
| 5,968,029 A | 10/1999 | Chappell et al. |
| 5,972,813 A | 10/1999 | Polat et al. |
| 6,010,598 A | 1/2000 | Boutilier et al. |
| 6,039,839 A | 3/2000 | Trokhan et al. |
| 6,099,781 A | 8/2000 | Ampulski |
| 6,099,940 A | 8/2000 | Hamilton et al. |
| 6,110,324 A | 8/2000 | Trokhan et al. |
| 6,193,918 B1 | 2/2001 | McGuire et al. |
| 6,254,965 B1 | 7/2001 | McGuire et al. |
| 6,319,455 B1 | 11/2001 | Kauschke et al. |
| 6,610,173 B1 | 8/2003 | Lindsay et al. |
| 6,733,626 B2 | 5/2004 | Ruthven et al. |
| 6,846,172 B2 | 1/2005 | Vaughn et al. |
| 2004/0013852 A1* | 1/2004 | Curro et al. .................. 428/131 |

\* cited by examiner

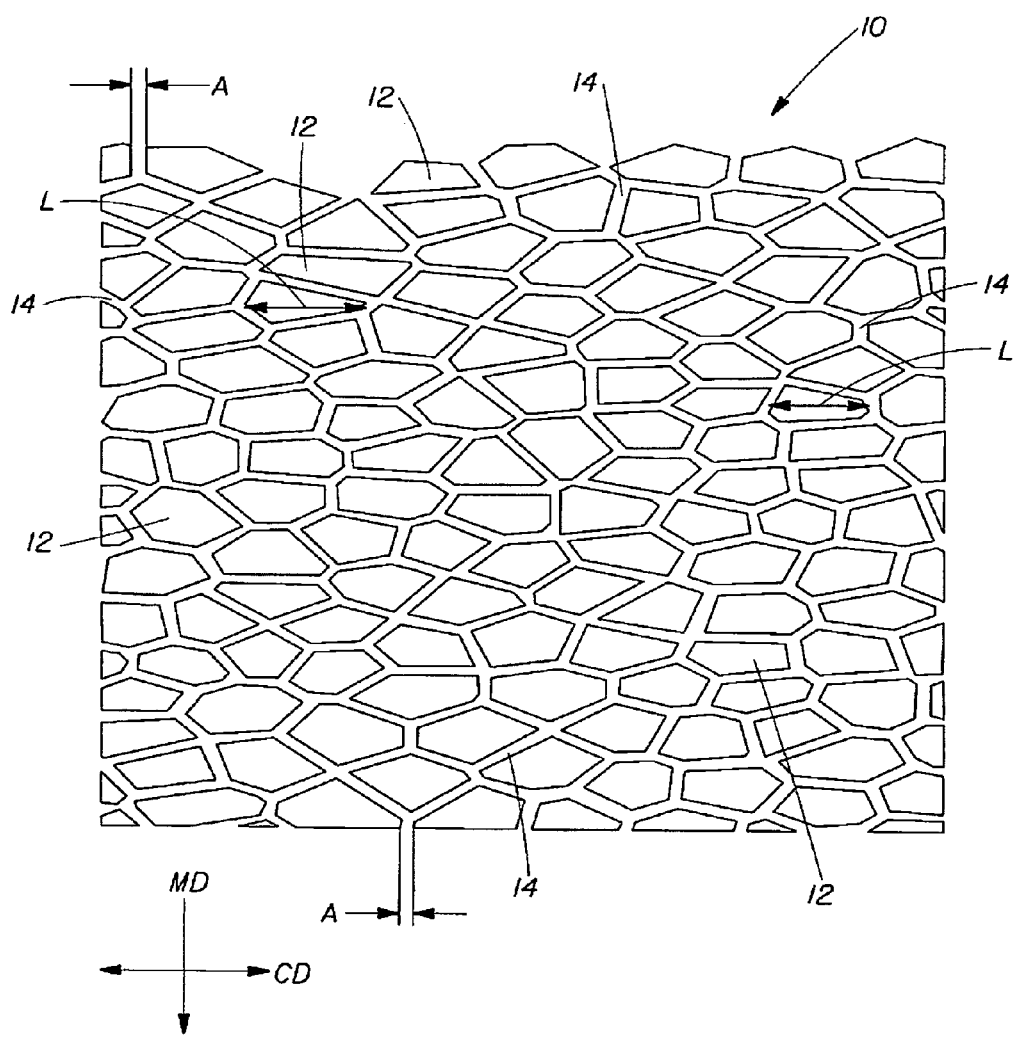

AMORPHOUS PATTERNS COMPRISING ELONGATE PROTRUSIONS FOR USE WITH WEB MATERIALS

FIELD OF THE INVENTION

The present invention relates to web materials having amorphous patterns formed thereon. More particularly, the present invention relates to web materials having a plurality of three-dimensional protrusions extending outwardly from at least one side of the material that form an amorphous pattern. The three-dimensional protrusions are preferably elongate in the cross-machine direction of the web material.

BACKGROUND OF THE INVENTION

Web materials having three-dimensional surfaces are well known in the art and have been utilized in many different applications. Such web materials may be made in planar web form and remain in that form throughout handling or they may be made in continuous web form and be wound on rolls for handling. An exemplary three-dimensional web material, as well as methods and apparatus for manufacturing same, is disclosed in U.S. Pat. No. 5,662,758. An exemplary method for providing amorphous embossing patterns upon a web material is described in U.S. Pat. No. 6,254,965.

Accordingly, it would be desirable to provide a manipulated amorphous structure for a formed web material so that randomness is preserved yet desired structural properties can be designed into the material. Unlike array patterns, an amorphous pattern eliminates linearity and pattern repetition in the web material, providing for macro scale uniform appearance. The amorphous pattern provides maximum space utilization which is preferred for building caliper and drying the web material. Elongating the amorphous pattern in a given direction while maintaining equal overall pattern area allows the modulus (i.e., slope of the load vs. elongation curve) of the web material to be increased or decreased while still preserving the characteristics of the amorphous pattern.

A web material run through a constant depth deformation device, such as an embosser, will undergo elongation deformation. If the emboss impression is to remain in the web material after the embosser disengages, the web must be elongated to the yield point during embossing. A lower modulus material will by definition elongate a greater amount than a higher modulus material with equal tensile strength. If the amount of elongation of the web material becomes too great, and the elongated substrate is constrained by repeating, co-linear emboss groupings, the elongated substrate will buckle and form a hump of elongated material beyond the plane of the local material. Furthermore, regardless of emboss design, a lower modulus, equal tensile substrate will require greater embosser engagement (material elongation) to reach the yield point. Thus, a higher modulus material is preferable because it elongates less, requiring less engagement of emboss pins to reach permanent deformation (and permanent emboss) and creating less buckling within a constrained area.

Accordingly, in order to overcome these issues, it would be desirable to provide a web material having an amorphous pattern comprising elongate two-dimensional geometrical shapes disposed thereon. Further, it would be desirable to provide a method for forming such web materials having an amorphous pattern comprising elongate two-dimensional geometrical shapes which may be suitably tailored for a particular material need and which may be readily and economically practiced.

SUMMARY OF THE INVENTION

The present invention provides a three-dimensional web material having a machine direction, a cross-machine direction, a first side, and a second side. The first side comprises at least one region having a plurality of spaced three-dimensional protrusions extending outwardly from the first side. The protrusions form an amorphous pattern of elongate two-dimensional geometrical shapes that have a longitudinal axis having an angle relative to either of the machine direction or the cross-machine direction. Additionally, the protrusions have a statistically-controlled degree of randomness.

The present invention also provides an embossment pattern for a three-dimensional web material having a machine direction, a cross-machine direction, and a first side. The embossment pattern comprises a plurality of spaced three-dimensional protrusions extending outwardly from the first side. The protrusions form an amorphous pattern of elongate two-dimensional geometrical shapes that have a longitudinal axis having an angle relative to either of the machine direction or the cross-machine direction. Further, the protrusions have a statistically-controlled degree of randomness.

BRIEF DESCRIPTION OF THE DRAWING

FIG. 1 is a plan view of an amorphous pattern for a three-dimensional web material in accordance with the present invention.

DETAILED DESCRIPTION OF THE INVENTION

The web materials of the present invention exhibit a three-dimensional structure comprising a plurality of individual elongate, three-dimensional, hollow protrusions extending from a contiguous base structure. Preferably, the individual, elongate, three-dimensional hollow protrusions are formed into non-uniform, elongate, frustum shapes having an aspect ratio (width-to-height) preferably greater than 1 in a single dimension within the plane of the web material. Preferably, the web material exhibits a non-uniform pattern of elongate frustum shapes where the longitudinal axis of each frustum shape is disposed at an angle relative to the machine direction and/or the cross-machine direction and preferably in the cross-machine direction of the web material. More preferably, the web material exhibits a non-uniform pattern of elongate frustum shapes where the longitudinal axis of each frustum shape is disposed within +/−10 degrees of the cross-machine direction of the web material. However, as would be known to one of skill in the art, the longitudinal axis of each frustum shape can be disposed in any direction in the plane of the web. Without desiring to be bound by theory, it is believed that elongating the shape of each frustum shape in the cross-machine direction can increase the modulus of the web material in the cross-machine direction by minimizing the area in which the frustum can collapse. Further, alignment of the longitudinal axis of each frustum parallel with the cross-machine direction can provide rigidity and structure to prevent collapse of each frustum in the cross-machine direction when the web material is subject to a machine direction tension.

The three-dimensional web materials of the present invention preferably exhibit a two-dimensional pattern of elongate three-dimensional protrusions that is substantially amorphous in nature. The term "amorphous" refers to a pattern which exhibits no readily perceptible organization, or regularity, but may exhibit a perceptible orientation, of constituent elements. In such a pattern, the arrangement of one element with regard to a neighboring element bear no predictable relationship, other than orientation, to that of the next succeeding element(s). Contrastingly, an "array" refers to patterns of constituent elements which exhibit a regular, ordered grouping or arrangement. In an array pattern, the arrangement of one element with regard to a neighboring element bear a predictable relationship to that of the next succeeding element(s).

While it is presently preferred that the entire surface of a web material in accordance with the present invention be provided with an elongate, amorphous pattern, under some circumstances it may be desirable for less than the entire surface of such a web material to exhibit such a pattern. For example, a comparatively small portion of the web material may exhibit some regular pattern of protrusions or may in fact be free of protrusions so as to present a generally planar surface. In addition, when the web material is to be formed as a comparatively large web of material and/or as an elongated continuous web material to be folded or wound upon itself, manufacturing constraints may require that the amorphous pattern itself be repeated periodically within the web material.

In a web material provided with an amorphous pattern of elongate three-dimensional protrusions, any selection of an adjacent plurality of protrusions will be unique within the scope of the pattern, even though under some circumstances it is conceivable that a given individual protrusion may possibly not be unique within the scope of the pattern. Three-dimensional web materials having a two-dimensional pattern of elongate three-dimensional protrusions which are substantially amorphous in nature are also believed to exhibit "isomorphism." The terms "isomorphism" and "isomorphic" refer to substantial uniformity in geometrical and structural properties for a given circumscribed area wherever such an area is delineated within the pattern. By way of example, a prescribed area comprising a statistically-significant number of protrusions with regard to the entire amorphous pattern would yield statistically substantially equivalent values for such web properties as protrusion area, number density of protrusions, total protrusion wall length, etc., when measured with respect to direction. The term "anisomorphic" is substantially opposite in meaning from the term isomorphic. A three-dimensional web material having substantially anisomorphic properties has properties that are different when measured along axes in different directions.

Utilization of an amorphous pattern of elongate three-dimensional protrusions can provide other advantages. For example, a three-dimensional web material formed from a material which is initially isotropic within the plane of the material can become generally anisotropic with respect to physical web properties in directions within the plane of the material. The term "isotropic" refers to web properties that are exhibited to substantially equal degrees in all directions within the plane of the material. The term "anisotropic" is substantially opposite in meaning from the term isotropic. Thus, it is believed that a web material can be provided with tensile properties in any preferred direction within the plane of the material if the starting material was isotropic in tensile properties. This can be beneficial, for example, in that increasing the cross-machine direction modulus in a substrate with equal tensile properties can decrease the cross-machine direction elongation of the substrate when the substrate is subject to a tension (e.g., processing the substrate through an embossing apparatus). Thus the material is not lengthened to an extent that the web material buckles in the z-direction (i.e., a hump outside of the plane of the web) when constrained within a finite space. Furthermore, without desiring to be bound by theory, it is believed that by increasing the cross-machine direction modulus, a web material can require less engagement in an embossing apparatus (i.e., undergo substrate elongation) to reach the yield point of the web material.

Within the preferred amorphous pattern, the elongate protrusions are preferably non-uniform with regard to their size, shape, and spacing between adjacent protrusion centers with respect to the web, and generally uniform with respect to their orientation. Differences in center-to-center spacing of protrusions in the pattern result in the spaces between protrusions being located in different spatial locations with respect to the overall web. In a completely amorphous pattern, as would be presently preferred, the center-to-center spacing of adjacent elongate protrusions is random, at least within a designer-specified bounded range, so that there is an equal likelihood of the nearest neighbor to a given protrusion occurring at any given angular position within the plane of the web. Other physical geometrical characteristics of the web are also preferably random, or at least non-uniform, within the boundary conditions of the pattern, such as the number of sides of the elongate protrusions, angles included within each elongate protrusion, size of the elongate protrusions, etc. However, while it is possible and in some circumstances desirable to have the spacing between adjacent elongate protrusions be non-uniform and/or random, the selection of polygon shapes which are capable of interlocking together makes a uniform spacing between adjacent elongate protrusions possible.

A web material can be intentionally created with a plurality of amorphous areas within the same web or web, even to the point of replication of the same amorphous pattern in two or more such regions. The designer may purposely separate amorphous regions with a regular, defined, non-amorphous pattern or array, or even a "blank" region with no protrusions at all, or any combination thereof. The formations contained within a non-amorphous area can be of any number density, height, and/or shape. Further, the shape and dimensions of the non-amorphous region itself can be customized as desired. Additional, but non-limiting, examples of formation shapes include wedges emanating from a point, truncated wedges, polygons, circles, curvilinear shapes, and/or combinations thereof.

Additionally, a single amorphous region may fully envelop or circumscribe one or more non-amorphous areas. For example, a single, continuous amorphous region with non-amorphous patterns fully enclosed near the center of the web or web. Such embedded patterns can be used to communicate brand name, the manufacturer, instructions, material side or face indication, other information or simply be decorative in nature.

Multiple non-amorphous regions may be abutted or overlapped in a substantially contiguous manner to substantially divide one amorphous pattern into multiple regions or to separate multiple amorphous regions that were never part of a greater single amorphous region beforehand. Thus, it should be apparent to one of skill in the art that the utilization of an amorphous pattern of three-dimensional protrusions, elongate or otherwise, can enable the fabrication of webs having the advantages of an array pattern. This includes, for example, statistical uniformity in web properties on an area/location basis.

Webs according to the present invention may have elongate protrusions formed of virtually any three-dimensional shape and accordingly need not be all of a convex polygonal shape. However, it is presently preferred to form the protrusions in the shape of substantially-equal-height frustums having convex and elongate polygonal bases in the plane of one surface of the material and having interlocking, adjacent parallel sidewalls. For other applications, however, the protrusions need not necessarily be of polygonal shape.

As used herein, the term "polygon" and "polygonal" refers to a two-dimensional geometrical figure with three or more sides. Accordingly, triangles, quadrilaterals, pentagons, hexagons, etc. are included within the term "polygon", as would curvilinear shapes such as circles, ellipses, etc. which can be considered as having a mathematically infinite number of sides.

When designing an elongate three-dimensional structure, the desired physical properties of the resulting structure will dictate the size, geometrical shape, and spacing of the elongate, three-dimensional topographical features as well as the choice of materials and forming techniques. For example, the bending modulus, flexibility, and/or reaction to tension of the overall web can depend upon the relative proportion of two-dimensional material between three-dimensional protrusions.

When describing properties of three-dimensional structures of non-uniform, particularly non-circular, shapes and non-uniform spacing, it is often useful to utilize "average" quantities and/or "equivalent" quantities. For example, in terms of characterizing linear distance relationships between three-dimensional protrusions in a two-dimensional pattern, where spacings on a center-to-center basis or on an individual spacing basis, an "average" spacing term may be useful to characterize the resulting structure. Other quantities that could be described in terms of averages would include the proportion of surface area occupied by protrusions, protrusion area, protrusion circumference, protrusion diameter, percent eccentricity, percent elongation, and the like. For other dimensions such as protrusion circumference and protrusion diameter, an approximation can be made for protrusions which are non-circular by constructing a hypothetical equivalent diameter as is often done in hydraulic contexts.

The three-dimensional shape of individual protrusions is believed to play a role in determining both the physical properties of individual elongate protrusions as well as overall web properties. However, it should be noted that the foregoing discussion assumes geometric replication of three-dimensional structures from a forming structure of geometrically-sound shapes. "Real world" effects such as curvature, degree of moldability, radius of corners, etc. should be taken into account with regard to ultimately exhibited physical properties. Further, the use of an interlocking network of frustums can provide some sense of uniformity to the overall web structure, which aids in the control and design of overall web properties such as web stretch, tensile strength, roll profile and thickness, etc., while maintaining the desired degree of amorphism in the pattern.

The use of elongate polygons having a finite number of sides in an amorphous pattern arranged in an interlocking relationship can also provide an advantage over structures or patterns employing circular, nearly-circular, and or elliptical shapes. Patterns such as arrays employing closely-packed circles or ellipses can be limited in terms of the amount of area the circle or ellipse can occupy relative to the non-circled area between adjacent circles and/or ellipses. More specifically, even patterns where adjacent circles and/or ellipses touch at their point of tangency there will still be a given amount of space "trapped" at the "corners" between consecutive points of tangency. Accordingly, amorphous patterns of circular and/or elliptical shapes can be limited in terms of how little non-circle/ellipse area can be designed into the structure. Conversely, interlocking polygonal shapes with finite numbers of sides (i.e., no shapes with curvilinear sides) can be designed so as to pack closely together and in the limiting sense can be packed such that adjacent sides of adjacent polygons can be in contact along their entire length such that there is no "trapped" free space between corners. Such patterns therefore open up the entire possible range of polygon area from nearly 0% to nearly 100%, which may be particularly desirable for certain applications where the low end of free space becomes important for functionality.

Any suitable method may be utilized to design the interlocking polygonal arrangement of hollow frustums which provides suitable design capability in terms of desirable protrusion size, shape, taper, spacing, repeat distance, eccentricity, and the like. Even manual methods of design may be utilized. The pattern of elongate polygons may be imparted to the starting web material in any suitable fashion, including manual methods and methods of individually custom-forming the protrusions. However, in accordance with the present invention, an expeditious method of designing and forming such protrusions has been developed which permits the precise tailoring of desirable protrusion size, shape, taper, spacing, eccentricity, and/or elongation within an amorphous pattern, repeat distance of the amorphous pattern, and the like, as well as the continuous formation of webs containing such protrusions in an automated process.

The design of a totally random pattern can be time-consuming and complex, as would the method of manufacturing the corresponding forming structure. In accordance with the present invention, the attributes discussed supra may be obtained by designing patterns or structures where the relationship of adjacent cells or structures to one another is specified, as is the overall geometrical character of the cells or structures, but the precise size, shape, and orientation of the cells or structures is non-uniform and non-repeating. The term "non-repeating" refers to patterns or structures where an identical structure or shape is not present at any two locations within a defined area of interest. While there may be more than one protrusion of a given size, shape, and/or elongation within the pattern or area of interest, the presence of other protrusions around them of non-uniform size, shape, and/or elongation could eliminate the possibility of an identical grouping of protrusions being present at multiple locations. In other words, the pattern of elongate protrusions is non-uniform throughout the area of interest such that no grouping of protrusions within the overall pattern will be the same as any other like grouping of protrusions.

It should be known to those of skill in the art that mathematical modeling can simulate real-world performance. Exemplary modeling is described in "Porous cellular ceramic membranes: a stochastic model to describe the structure of an anodic oxide membrane", by J. Broughton and G. A. Davies, Journal of Membrane Science, Vol. 106 (1995), pp. 89-101; "Computing the n-dimensional Delaunay tessellation with application to Voronoi polytopes", D. F. Watson, The Computer Journal, Vol. 24, No. 2 (1981), pp. 167-172; and, "Statistical Models to Describe the Structure of Porous Ceramic Membranes", J. F. F. Lim, X. Jia, R. Jafferali, and G. A. Davies, Separation Science and Technology, 28(1-3) (1993), pp. 821-854.

A two-dimensional polygonal pattern has been developed that is based upon a constrained Voronoi tessellation of 2-space. In such a method, nucleation points are placed in random positions in a bounded (pre-determined) plane which are equal in number to the number of polygons, elongate or otherwise, desired in the finished pattern. A computer program "grows" each point as a circle simultaneously and radially from each nucleation point at equal rates. As growth fronts from neighboring nucleation points meet, growth stops and a boundary line is formed. These boundary lines each form the edge of a polygon, with vertices formed by intersections of boundary lines. The vertices are then preferentially elongated in the direction of choice (i.e., machine direction, cross-machine direction, or any direction therebetween) by scaling with a constant.

While this theoretical background is useful in understanding how such amorphous patterns may be generated as well as the properties of such amorphous patterns, there remains the issue of performing the above numerical repetitions step-wise to propagate the nucleation points outwardly throughout the desired field of interest to completion. Accordingly, to expeditiously carry out this process, a computer program is preferably written to perform these calculations given the appropriate boundary conditions and input parameters and deliver the desired geometry.

The first step in generating a pattern for making a three-dimensional forming structure is to establish the dimensions of the desired forming structure. For example, if it is desired to construct a forming structure 8 inches wide and 10 inches long, or optionally forming a drum, belt, or plate, then an X-Y coordinate system is established with the maximum X dimension ($X_{Max}$) being 8 inches and the maximum Y dimension ($Y_{Max}$) being 10 inches (or vice-versa).

After the coordinate system and maximum dimensions are specified, the next step is to determine the number of "nucleation points" which will become the elongate polygons corresponding to the number of protrusions desired within the defined boundaries of the forming structure. This number is an integer between 0 and infinity, and should be selected with regard to the average size, spacing, and elongation of the polygons desired in the finished pattern. Larger numbers correspond to smaller polygons, and vice-versa. A useful approach to determining the appropriate number of nucleation points or polygons is to compute the number of polygons of an artificial, hypothetical, uniform size and shape that would be required to fill the desired forming structure. Assuming common units of measurement, the forming structure area (length times width) divided by the square of the sum of the elongate polygon diameter and the spacing between polygons will yield the desired numerical value N (rounded to the nearest integer). This formula in equation form would be:

$$N = \frac{X_{Max} Y_{Max}}{(\text{polygon size} + \text{polygon spacing})^2}$$

Next, a suitable random number generator, known to those skilled in the art, is used. A computer program is written to run the random number generator for the desired number of iterations to generate as many random numbers as required to equal twice the desired calculated number of "nucleation points." As the numbers are generated, alternate numbers are multiplied by either the maximum X dimension or the maximum Y dimension to generate random pairs of X and Y coordinates all having X values between zero and the maximum X dimension and Y values between zero and the maximum Y dimension. These values are then stored as pairs of (X,Y) coordinates equal in number to the number of nucleation points.

The method described supra will generate a truly random pattern. This random pattern will have a large distribution of polygon sizes and shapes that may be undesirable. For example, a large distribution of polygon sizes may lead to large variations in web properties in various regions of the web and may lead to difficulties in forming the web depending upon the formation method selected. In order to provide some degree of control over the degree of randomness associated with the generation of nucleation point locations, a control factor or "constraint" is chosen and referred to hereafter as β (beta). The constraint limits the proximity of neighboring nucleation point locations through the introduction of an exclusion distance, E, which represents the minimum distance between any two adjacent nucleation points. The exclusion distance E is computed as follows:

$$E = \frac{2\beta}{\sqrt{\lambda \pi}}$$

where: λ (lambda) is the number density of points per unit area, and β ranges from 0 to 1.

To implement the control of the "degree of randomness," the first nucleation point is placed as described above. β is then selected, and E is calculated. Note that β, and thus E, remain constant throughout the placement of nucleation points. For every subsequent nucleation point (X,Y) coordinate that is generated, the distance from this point is computed to every other nucleation point that has already been placed. If this distance is less than E for any point, the newly-generated (X,Y) coordinates are deleted and a new set is generated. This process is repeated until all N points have been successfully placed. If β=0, then the exclusion distance is zero, and the pattern will be truly random. If β=1, the exclusion distance is equal to the nearest neighbor distance for a hexagonally close-packed array. Selecting β between 0 and 1 allows control over the "degree of randomness" between the upper and lower limits of the exclusion distance.

Once the complete set of nucleation points are computed and stored, a Delaunay triangulation is performed as the precursor step to generating the finished polygonal pattern. The use of a Delaunay triangulation provides a mathematically equivalent alternative to iteratively "growing" the polygons from the nucleation points simultaneously as circles, as described supra. Performing the triangulation generates sets of three nucleation points forming triangles, such that a circle constructed to pass through those three points will not include any other nucleation points within the circle. To perform the Delaunay triangulation, a computer program assembles every possible combination of three nucleation points, with each nucleation point being assigned a unique number (integer) for identification purposes. The radius and center point coordinates are then calculated for a circle passing through each set of three triangularly-arranged points. The coordinate locations of each nucleation point not used to define the particular triangle are then compared with the coordinates of the circle (radius and center point) to determine whether any of the other nucleation points fall within the circle of the three points of interest. If the constructed circle for those three points passes the test (no other nucleation points falling within the circle), then the three point numbers, their X and Y coordinates, the radius of the circle, and the X and Y coordinates of the circle center are stored. If the constructed circle for those three points fails the test, no results are saved and the calculation progresses to the next set of three points.

Once the Delaunay triangulation has been completed, a Voronoi tessellation of 2-space generates the finished polygons. To accomplish the tessellation, each nucleation point saved as a vertex of a Delaunay triangle forms the center of a polygon. The outline of the polygon is then constructed by sequentially connecting the center points of the circumscribed circles of each of the Delaunay triangles, including the vertex, sequentially in clockwise fashion. Saving these circle center points in a repetitive order such as clockwise enables the coordinates of the vertices of each polygon to be stored sequentially throughout the field of nucleation points. In generating the polygons, a comparison is made such that any triangle vertices at the boundaries of the pattern are omitted from the calculation since they will not define a complete polygon. Once the vertices are generated, they are then preferentially elongated by scaling with a constant based on the desired aspect ratio. Assuming conservation of 2-space area, the y-coordinate vertices can be scaled by the desired aspect ratio and the x-coordinate can be scaled by one over the desired aspect ratio.

Once a finished pattern of interlocking elongate polygonal two-dimensional shapes is generated, in accordance with the present invention, the network of interlocking shapes is utilized as the design for one web surface of a web of material with the pattern defining the shapes of the bases of the three-dimensional, hollow protrusions formed from the initially planar web of starting material. In order to accomplish this formation of protrusions from an initially planar web of starting material, a suitable forming structure comprising a negative of the desired finished three-dimensional structure is created with which the starting material is caused to conform by exerting suitable forces sufficient to permanently deform the starting material.

From the completed data file of polygon vertex coordinates, a physical output such as a line drawing may be made of the finished pattern of polygons. This pattern may be utilized in conventional fashion as the input pattern for a metal screen etching process to form a three-dimensional forming structure suitable for forming the materials of the present invention. If a greater spacing between the polygons is desired, a computer program can be written to add one or more parallel lines to each polygon side to increase their width (and hence decrease the size of the polygons a corresponding amount).

Preferably, the computer program described above provides a computer graphic (.TIFF) file for output. From this data file, a photographic negative can be made for use in a photoetching process to etch negative impressions into a base material to correspond to the desired frustum elongate polygonal shapes in the finished web of material. Alternatively, depending upon the desired process of generating the negative forming structure for forming the finished web, it may be desirable to tailor the output of the computer program to deliver coordinate points, and the like, of the polygonal recesses. Further, a photographic negative can be generated from this data file and used to provide a mask layer that is used to etch impressions into a material that will correspond to the desired frustum polygonal shapes in the finished web of material. This mask layer can alternatively be used to provide the desired pattern as described infra. In addition, if it were desirable to form a male pattern the computer output could be tailored to provide the desired information to the forming apparatus to the extent it may differ than for a negative (female) pattern.

Without desiring to be bound by theory, it is believed that a predictable level of consistency may be designed into the patterns generated according to the preferred method of the present invention even though amorphousness within the pattern is preserved. Accordingly, three-dimensional, elongate, amorphous-patterned, materials may be formed with statistically-predictable geometric and physical material properties.

Referring to FIG. 1, there is shown a plan view of a representative three-dimensional amorphous pattern for a web material of the present invention, which is generally indicated as 10. The amorphous pattern 10 has a plurality of elongate, non-uniformly shaped and sized, protrusions 12, surrounded by spaces or valleys 14 therebetween, which are preferably interconnected to form a continuous network of spaces within the amorphous pattern 10. FIG. 1 also shows a dimension A, which represents the width of spaces 14, measured as the substantially perpendicular distance between adjacent, substantially parallel walls at the base of the protrusions 12. In a preferred embodiment, the width of spaces 14 is preferably substantially constant throughout the pattern of protrusions 12 forming amorphous pattern 10. Each protrusion 12 is provided with a longitudinal axis L relative to either the machine direction of the cross-machine direction.

The term "deformable material" is intended to include foils, polymer webs, cloth, wovens, nonwovens, paper, paper boards, cellulose fiber webs, starch and starch substrates, knit fabrics, co-extrusions, laminates, polymeric films, and combinations thereof. The properties of a selected deformable material can include, though are not restricted to, combinations or degrees of being: porous, non-porous, microporous, gas or liquid permeable, non-permeable, hydrophilic, hydrophobic, hydroscopic, oleophilic, oleophobic, high critical surface tension, low critical surface tension, surface pre-textured, elastically yieldable, plastically yieldable, electrically conductive, and electrically non-conductive. Exemplary materials include wood, metal, rigid polymer stock, ceramic, glass, cured resin, thermoset materials, cross-linked materials, rubber, frozen liquids, concrete, cement, stone, man-made materials, etc. Such materials can be homogeneous or composition combinations.

In a preferred embodiment, the elongate protrusions 14 are provided with an aspect ratio greater than 1, preferably ranging from about 1 to about 5, in a single dimension within the plane of the web material. In another preferred embodiment, the number of protrusions 12 per square inch range from 7 to 700 protrusions per square inch, more preferably 50 to 300 protrusions per square inch, and even more preferably 75 to 180 protrusions per square inch. The protrusions occupy from about 10% to about 90%, more preferably from about 60% to about 80%, and even more preferably about 75%, of the available area of web of material 10, as measured parallel to the plane of sheet material 10. The elongate protrusions 12 preferably have a protrusion height greater than about 0.005 inches (0.13 mm), preferably ranging from about 0.005 inches (0.13 mm) to about 0.250 inches (6.35 mm), and more preferably ranging from about 0.010 inches (0.254 mm) to about 0.025 inches (0.64 mm) height.

Referring again to FIG. 1, elongate protrusions 12 preferably have a convex polygonal base shape, the formation of which is described infra. By convex polygonal shape, it is meant that the bases of the protrusions have multiple (three or more) linear sides. Of course, alternative base shapes are equally useful. However, the preferred elongate base shape is believed to be most easily generated. The elongate polygons preferably interlock in the plane of the lower or female surface, as in a tessellation, to provide constant width spacing between them. The width A of spaces 14 may be selected depending upon the amount of space desired between adjacent protrusions. In a preferred embodiment, width A is always less than the minimum protrusion dimension of any of plurality of protrusions 12.

Suitable methods and apparatii for making materials having elongate three-dimensional patterns as described herein are generally known to those of skill in the art. Such a method may be modified or tailored to suit a particular size, composition, etc. of the resulting material. By way of example, such a method may utilize a forming surface, which is preferably a three-dimensional screen having recesses and lands between the recesses. Such a forming structure can comprise a belt useful for through air drying. A belt suitable for use forming the invention of the instant application comprises generally two primary components—a framework and a reinforcing structure. The framework is preferably a cured polymeric photosensitive resin. The framework and belt have a first surface which defines the paper contacting side of the belt and an opposed second surface oriented toward the papermaking machine on which the belt is used. Preferably the framework defines the amorphous pattern 10 having elongate protrusions 12, described supra, which imprints the amorphous pattern 10 onto the paper of the instant invention.

The papermaking belt is preferably macroscopically mono-planar. The plane of the papermaking belt defines its MD and CD directions. Perpendicular to both the MD and CD directions is the z-direction. Likewise, the product according to the present invention can be thought of as macroscopically monoplanar and lying in the MD/CD plane.

The first surface of the belt contacts the paper carried thereupon. The first surface of the belt may imprint the pattern onto the paper corresponding to the pattern of the framework. Imprinting occurs any time the belt and paper pass between two rigid surfaces having a clearance sufficient to cause imprinting. This commonly occurs in a nip between two rolls. This most commonly occurs when the belt transfers the paper to a Yankee drying drum. Imprinting can be caused by compression of the framework against the paper at the pressure roll.

The second surface of the belt is the machine contacting surface. The second surface may be made with a backside network having passageways therein. The passageways provide irregularities in the texture of the backside of the second surface of the belt. These passageways can allow for air leakage in the MD/CD plane of the belt. Accordingly, a backside texture may be imparted to the belt.

The second primary component of the belt according to the process described herein is the reinforcing structure. The reinforcing structure, like the framework, has a first or paper-facing surface and a second machine-facing surface opposite the paper-facing surface. The reinforcing structure is primarily disposed between the opposed surfaces of the belt and may have a surface coincident, the backside of the belt. The reinforcing structure provides support for the framework. The reinforcing component is typically woven, as is known to those of skill in the art. Portions of the reinforcing structure can be in register with deflection conduits present on the second surface of the belt in order to prevent fibers used in papermaking from passing completely through the deflection conduits and thereby reducing the occurrences of pin holes. If one does not wish to use a woven fabric for the reinforcing structure, a non-woven element, screen, net, or plate having a plurality of holes therethrough, may provide adequate strength and support for the framework.

Although the preferred embodiment of the papermaking belt of the present method is in the form of an endless belt, it can be incorporated into numerous other forms which include, for instance, stationary plates for use in making hand sheets or rotating drums for use with other types of continuous processes. Exemplary papermaking belts and processes of using papermaking belts are disclosed in U.S. Pat. Nos. 4,514,345; 4,637,859; 5,328,565; 5,334,289; 5,496,624; 5,554,467; 5,679,222; and 5,906,710. Further, exemplary papermaking belts and products produced by such belts are disclosed in U.S. Pat. Nos. 4,514,345; 4,528,239; 4,529,480; 5,245,025; 5,275,700; 5,328,565; 5,334,289; 5,364,504; and 5,527,428.

Micro-texturing the material during forming may also be useful, such as in producing a distinction between one side of the material and the other side. Micro-texturing of the outermost surface features of the three dimensional structure may be achieved in the present invention, for example, by drawing the piece of material into forming screen recesses and against a micro-textured surface, such as a vacuum drum having tiny apertures therein.

A belt forming screen is believed advantageous to a flat plate or a drum forming screen because a belt enables screen patterns and pattern lengths to be changed more easily and larger patterns may be used without having massive rotating members. However, depending upon the desired quantity and dimensions of the material to be formed it may be equally suitable to fabricate the forming structure as a flat plate or rigid drum, and/or other forming structures and methods known in the art.

Because the same common forming screen is used to transfer the substance to the material as is used to form the protrusions, the substance pattern is conveniently registered with the protrusions. In the preferred embodiment, the top surface of forming screen is continuous except for recesses; thus, the substance pattern is totally interconnected in this configuration. However, if a discontinuous pattern of substance were coated onto forming screen, a discontinuous substance pattern between protrusions would result.

In accordance with the preferred method of manufacturing the three-dimensional web material, the three-dimensional elongate protrusions of the present invention are unitarily formed from the web of deformable material itself and are hollow structures with depressions in one side which preferably each have a size and three-dimensional shape corresponding substantially with the size and three-dimensional shape of their respective protrusion. However, it may also be desirable for some applications to utilize solid elongate protrusions unitarily, integrally, or separately formed from (and applied to) the web of material and which may or may not be deformable.

Additionally, a pattern of elongate protrusions can be superimposed either on a similar dimensional scale or on a different dimensional scale such as a single or multiple "microprotrusion" pattern located on the tops of other larger protrusions.

Exemplary uses of sheet materials having three-dimensional structure comprising a plurality of individual elongate, three-dimensional, hollow protrusions extending from a contiguous base structure include cleansing and cleaning implements such as wipes, cloths, towels, sponges, pads, and the like. The channels within the three-dimensional structure are employed to collect, imbibe, or scoop up dirt, solids, free liquids, or combinations thereof during cleaning and cleansing tasks. The amorphous pattern of channels or depressions can provide for efficient cleaning due to the advantageous properties of the amorphous pattern. This can allow for effective cleaning irrespective of wiping direction and/or the chosen portion of the pattern which contacts the surface or item to be cleaned. A substance can be included in the three-dimensional web material before use which may deliver advantageous cleaning or cleansing properties. Additionally, the present invention could be used as a three-dimensional spacing web for use as a packaging wrap formed and utilized to fill voids within a shipping container such that an item enclosed therein may be essentially immobilized.

However, while much of the foregoing discussion has been focused on three-dimensional web materials containing no additional substances, three-dimensional web materials containing a substance in addition to the material from which the web itself is formed, such as pressure-sensitive adhesives, food storage wraps, and the like are to be considered within the scope of the present invention.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it will be obvious to those skilled in the art that various changes and modifications may be made without departing from the spirit and scope of the invention, and it is intended to cover in the appended claims all such modifications that are within the scope of the invention.

What is claimed is:

1. A three-dimensional web material having a machine direction and a cross-machine direction orthogonal and coplanar with said machine direction, said material having a first side and a second side, wherein said first side comprises an amorphous pattern of spaced three-dimensional protrusions extending outwardly from a base disposed upon said first side, said base comprising an elongate two-dimensional geometrical shape disposed in said machine and cross-machine directions, each of said elongate two-dimensional geometrical shapes having an aspect ratio relative to said machine and cross-machine directions of greater than 1 and a longitudinal axis having an angle of from about −10 degrees to about +10 degrees relative to said cross-machine direction, said protrusions having a statistically-controlled degree of randomness.

2. The web material according to claim 1 wherein said elongate two-dimensional geometrical shapes include a plurality of different two-dimensional geometrical shapes.

3. The web material according to claim 1 wherein said protrusions are unitarily formed from said web material.

4. The web material according to claim 1 wherein said second side comprises a plurality of spaced three-dimensional hollow depressions corresponding to said protrusions such that said protrusions are hollow.

5. The web material according to claim 4 wherein the size and shape of each depression corresponds substantially to the size and shape of each corresponding protrusion.

6. The web material according to claim 1 wherein said web material exhibits anisotropic structural web properties in any one direction within the plane of the web material.

7. The web material according to claim 1 wherein said web material is substantially anisomorphic in geometrical and structural properties in any one direction for a given circumscribed area throughout said pattern.

8. The web material according to claim 1 wherein any single protrusion within said amorphous pattern has an equal probability of the nearest neighboring protrusion being located at any angular orientation with the plane of said material.

9. The web material according to claim 1 wherein said amorphous pattern comprises interlocking convex polygons each having a finite number of substantially linear sides with facing sides of adjacent polygons being substantially parallel.

10. The web material according to claim 1 wherein the web material is formed from an isotropic web of material and whereas the web material exhibits anisotropic structural web properties in any one direction within the plane of said web material.

11. The web material according to claim 1 wherein said material is selected from the group consisting of foils, polymer webs, cloth, wovens, nonwovens, paper, paper boards, cellulose fiber webs, starch and starch substrates, knit fabrics, co-extrusions, laminates, polymeric films, and combinations thereof.

12. The web material according to claim 1 wherein said protrusions occupy from about 10% to about 90 of the available area of said web material as measured parallel to the plane of said web material.

13. The web material according to claim 1 wherein said protrusions have an aspect ratio ranging from greater than 1 to about 5 in said cross-machine direction within the plane of said web material.

14. The web material according to claim 1 wherein said protrusions have a number of protrusions per square inch ranging from 7 to 700.

15. The web material according to claim 1 wherein said protrusions have a protrusion height greater than about 0.005 inches (0.13 mm).

16. An embossment pattern for a three-dimensional web material having a machine direction, a cross-machine direction orthogonal and coplanar with said machine direction, and a first side, said embossment pattern comprising a plurality of spaced three-dimensional protrusions extending outwardly from said first side, each of said plurality of spaced three-dimensional protrusions having an elongate base disposed upon said first side, said elongate base comprising an elongate two-dimensional geometrical shape disposed in said machine and cross-machine directions, each of said elongate bases having an aspect ratio ranging from greater than 1 to about 5 in said machine direction and a longitudinal axis having an angle of from about −10 degrees to about +10 degrees relative to said cross-machine direction, said protrusions having a statistically-controlled degree of randomness.

17. The embossment pattern according to claim 16 wherein said amorphous pattern includes a plurality of different two-dimensional geometrical shapes.

18. The embossment pattern according to claim 16 wherein any single protrusion within said embossment pattern has an equal probability of the nearest neighboring protrusion being located at any angular orientation with the plane of said material.

19. The embossment pattern according to claim 16 wherein said plurality of protrusions in said amorphous pattern comprise interlocking convex polygons each having a finite number of substantially linear sides with facing sides of adjacent polygons being substantially parallel.

* * * * *